United States Patent
Ogawa (10) Patent No.: US 6,679,942 B2
(45) Date of Patent: Jan. 20, 2004

(54) CHEMICAL ADSORPTION SOLUTION AND METHOD OF PRODUCING CHEMICALLY ADSORBED FILM USING THE CHEMICAL ADSORPTION SOLUTION

(75) Inventor: Kazufumi Ogawa, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 262 days.

(21) Appl. No.: 10/008,708

(22) Filed: Nov. 13, 2001

(65) Prior Publication Data

US 2002/0058775 A1 May 16, 2002

(30) Foreign Application Priority Data

Nov. 14, 2000 (JP) ........................................ 2000-346422

(51) Int. Cl.[7] .................................................. C09K 3/00
(52) U.S. Cl. ............................. 106/287.1; 106/287.11; 106/287.13; 106/287.16
(58) Field of Search ......................... 106/287.1, 287.11, 106/287.13, 287.16

(56) References Cited

U.S. PATENT DOCUMENTS 5,246,740 A * 9/1993 Mino et al. .................. 427/437
5,324,543 A * 6/1994 Ogawa et al. ............... 427/387

* cited by examiner

Primary Examiner—David Brunsman
(74) Attorney, Agent, or Firm—Merchant & Gould P.C.

(57) ABSTRACT

The present invention provides a chemical adsorption solution prepared by dissolving a silane-based chemical adsorption material in a non-aqueous organic solvent, in which the non-aqueous organic solvent is a mixture including a first non-aqueous organic solvent and a second non-aqueous organic solvent having a boiling point higher than that of the first non-aqueous organic solvent. A preferable difference in the boiling point is at least 10° C. Preferably, the first non-aqueous organic solvent has a boiling point of not more than 120° C. and the second non-aqueous organic solvent has a boiling point of not less than 150° C. The chemical adsorption solution coated on a substrate is concentrated by evaporating the solvent having the lower boiling point, so that a chemically adsorbed film having a uniform film thickness can be formed in a short time.

23 Claims, 6 Drawing Sheets

CHEMICAL ADSORPTION SOLUTION AND METHOD OF PRODUCING CHEMICALLY ADSORBED FILM USING THE CHEMICAL ADSORPTION SOLUTION

BACKGROUND OF THE INVENTION

1. Field of the Invention

The present invention relates to a method of producing a monomolecular film. The present invention relates also to a method of producing a liquid crystal orientation film comprising a monomolecular film. The liquid crystal orientation film may be used for a liquid crystal display.

2. Description of the Related Art

Chemical adsorption is used for forming thin films of a molecular length level, provided with functions such as waterproofing, oil-repellency, and contamination resistance. Such chemically adsorbed films are expected to be used as waterproof films, protective films or the like.

A well-known method of producing monomolecular films is a Langmuir-Blodgett's technique (LB technique). The LB technique is used for forming monomolecular films or laminates thereof by transferring monomolecular films on water surface by using a property that the amphiphilic organic molecules form a monomolecular film having hydrophilic groups, directing the hydrophilic groups downwards. In an example of the LB technique, a substrate dipped in water is raised off from the water whose surface is provided with a monomolecular film at a constant speed, so that the monomolecular film is adhered to the substrate surface.

In a common and further effective method for forming a monomolecular film, a solution of a chemical adsorption material is fed to a substrate by means of, for example, off-set printing and screen printing. After a reaction between the chemical adsorption material and the substrate surface, excessive chemical adsorption material is removed.

In some liquid crystal displays, chemically adsorbed films are used experimentally as liquid oriented films.

Liquid crystal orientation films are used for maintaining order in the orientation of liquid crystal molecules. Conventionally used coating films are formed from a solution of polyvinyl alcohol or polyimide. Such liquid crystal orientation films are obtained by forming a coating film by means of rotational coater or the like and rubbing the film by means of a felt cloth or the like. Since it is substantially impossible to form a film having a uniform thickness throughout on a substrate surface in this method, irregularities or burn-in can occur on the panel display. Moreover, the thickness of such a liquid crystal orientation film cannot be decreased drastically even if driving voltage of the panel should be lowered to reduce the power consumption.

On the other hand, a chemically adsorbed film is as thin as from 0.4 nm to 3 nm. Moreover, it does not require rubbing.

Such a chemically adsorbed film can be formed, for example, by the LB technique. In the LB technique, a polyamic acid derivative compound is prepared by an ionic bonding reaction between polyamic acid and a long chain alkyl amine. The polyamic acid derivative compound is applied to a substrate surface on which an electrode has been formed so as to form a monomolecular film. Then, the film coated on the substrate is imidized so as to obtain a polyimide film as a liquid crystal orientation film. A monomolecular film of the polyamic acid derivative compound adhered onto the substrate by the LB technique comprises long mono-molecules aligned along a direction for raising the substrate. Therefore, a polyimide film produced by imidization of the coating film has a property to orient liquid crystal molecules in one direction.

It is effective in this technique to raise the treatment temperature or solution concentration for the purpose of shortening the time required for fixing the chemical adsorption material on a surface of a substrate. Raising the temperature will require equipment for heat treatment. Increasing the solution concentration can shorten the treatment time more effectively. However, increasing the concentration can cause problems during handling the solution since the viscosity of the solution is raised. In addition, chemical adsorption materials will be reacted with moisture in the atmosphere so that the material will be polymerized easily. A chemical adsorption material polymerized on the substrate surface is difficult to remove even by washing in a post-step to remove the chemical adsorption material remaining on the substrate surface.

When a chemical adsorption solvent contains only a low-boiling temperature solvent such as hexamethyl silicone, the concentration of the adsorbed solution adhered to the substrate surface is increased sharply due to evaporation of the solvent during the adsorption. As a result, the adsorption reaction is accelerated during the treatment, and thus, the time for the treatment is shortened considerably. However, this will accelerate polymerization on the substrate surface as well, and hinders washing as mentioned above. For avoiding the problem, treatment should be carried out in a dry atmosphere with a relative humidity of not more than 35%.

SUMMARY OF THE INVENTION

In the light of the foregoing, a purpose of the present invention is to form efficiently in a short time a thin chemically adsorbed film having a uniform thickness.

For this purpose, the present invention provides a chemical adsorption solution by dissolving in a non-aqueous organic solvent a silane-based chemical adsorption material, and the non-aqueous organic solvent is a mixture of a first non-aqueous organic solvent and a second non-aqueous organic solvent having a boiling point higher than that of the first non-aqueous organic solvent.

A method of producing a chemical adsorption solution according to the present invention comprises: dissolving a silane-based chemical adsorption material in a mixed solvent comprising a first non-aqueous organic solvent and a second non-aqueous organic solvent having a boiling point higher than that of the first non-aqueous organic solvent so as to prepare a chemical adsorption solution; adhering the chemical adsorption solution to a surface of a substrate in order to keep the second non-aqueous organic solution in the chemical adsorption solution while preferably evaporating the first non-aqueous organic solvent to concentrate the solution so that the end parts of chemically adsorbed molecules in the chemical adsorption solution are bonded chemically to the surface of the substrate; and washing the surface of the substrate by using a washing solvent so as to remove the chemical adsorption solution remaining on the substrate.

In the present invention, a chemically adsorbed film having a uniform thickness can be formed efficiently in a short time. More specifically, the present invention can provide in a short time and with high efficiency liquid crystal orientation films that are extremely thin and enable accurate control of the orientation direction of the liquid crystal.

DETAILED DESCRIPTION OF THE INVENTION

According to the present invention, a mixed solvent is used in a method of providing a chemically adsorbed film of a silane-based chemical adsorption material by contacting a solution of the silane-based material to a substrate and fixing the silane-based material on the substrate surface.

In a mixture of plural solvents, a solvent having a lower boiling point will evaporate faster than the other solvent(s). Therefore, in the present invention, a solvent having a lower boiling point is evaporated intentionally during a step of feeding a solution of a silane-based chemical adsorption material to the substrate surface. Thereby, the solution is more concentrated at a time of treatment than at a time of feeding to the substrate.

A method of producing a chemically adsorbed film according to the present invention comprises steps of: preparing a chemical absorption solvent by dissolving a silane-based chemical adsorption material in a mixture comprising a first non-aqueous organic solvent and a second non-aqueous organic solvent having a boiling point higher than that of the first non-aqueous organic solvent; adhering the chemical adsorption solution to a surface of a substrate having exposed hydroxyl groups in a dry atmosphere; evaporating the first non-aqueous organic solvent in the chemical adsorption solution adhered to the substrate while bonding chemically end parts of the chemical adsorption material in the chemical adsorption solution to the substrate surface; and washing the substrate surface by using a washing solvent in order to remove the chemical adsorption solution remaining on the substrate.

When a solvent that is likely to evaporate is included in the chemical adsorption solution at the time of a reaction between the substrate and the chemical adsorption material, the chemical adsorption solution fed to the substrate surface is concentrated gradually. This accelerates the reaction between the chemical adsorption material and the substrate surface, so that the reaction is completed in a short time. The step of chemically bonding the end parts of the chemical adsorption material and the substrate surface (that is, hydrophilic groups such as hydroxyl groups exposed to the surface) can be finished before all the first non-aqueous organic solvent volatilizes. Alternatively, the bonding step can be continued for a certain period even after all the first non-aqueous organic solvent has volatilized.

It is preferable in the present invention that a content of the second non-aqueous organic solvent in the mixed solvent is in a range from 0.1 wt % to 20 wt %, more preferably, from 1 wt % to 10 wt %.

It is preferable that a difference in the boiling point between the first and second non-aqueous organic solvents is in a range from 10° C. to 200° C., more preferably, from 20° C. to 100° C.

It is preferable that the boiling point of the first non-aqueous organic solvent is in a range from 65° C. to 120° C., more preferably, from 100° C. to 120° C. When the boiling point of the first non-aqueous organic solvent is lower than 65° C., evaporation is accelerated excessively and the control of the concentration will become difficult.

It is preferable that the boiling point of the second non-aqueous organic solvent is at least 150° C.

In the present invention, the chemical adsorption material remaining on the substrate even after the treatment for bonding the chemically adsorbed molecules is dissolved in the solvent uniformly at a high concentration. Therefore, the chemical adsorption material will not be solidified by a reaction with moisture in the atmosphere. On the other hand, in a conventional method, all the solvent is dried and removed before washing to remove excessive chemical adsorption materials solidified on the substrate surface. Accordingly, many washing steps for removing the material can be omitted in the present invention. In other words, the present invention provides further improved films, and such films are not degraded even under a condition of a relative humidity of about 50%.

The thus washed substrate surface is tilted in a given direction such as a vertical direction so as to remove the washing solvent on the substrate surface, so that the molecules of the chemical adsorption material fixed on the substrate surface can be oriented in the tilted direction.

When a content of the second non-aqueous organic solution is not more than 10 weight parts, or preferably not more than 5 weight parts, to 100 weight parts of the mixed solvent, the chemical adsorption material can be concentrated more effectively by the evaporation of the solvent, and thus, the time for adsorption can be shortened further effectively.

It is preferable that the chemical adsorption material comprises either a straight carbon chain or a siloxane bonding chain together with a chlorosilyl group, an alkoxysilyl group or an isocyanato silyl group.

It is preferable that the difference in the boiling point between the first and second non-aqueous organic solvents is at least 10° C., or preferably at least 30° C., allow evaporation of the first non-aqueous organic solvent effectively while restraining the evaporation of the second non-aqueous organic solvent.

A first non-aqueous organic solvent having a boiling point of not more than 120° C. can be evaporated in a short time even at room temperature. A second non-aqueous organic solvent having a boiling point of at least 150° C. can be prevented from evaporating substantially during the evaporation of the first non-aqueous organic solvent.

It is preferable that the first and second non-aqueous organic solvents have desired boiling points respectively and they are selected from methyl silicone-based solvents or hydrocarbon-based solvents, since these solvents have a wide range of boiling points. Among the methyl silicone-based solvents, examples of the first non-aqueous organic solvent having a low boiling point are hexamethyldisiloxane and pentamethyl methoxyl disiloxane. Examples of the second non-aqueous organic solvent having a high boiling point are hexamethyl cyclosiloxane, octamethyl trisiloxane, and decamethyl tetrasiloxane. Among hydrocarbon-based solvents, examples of the first non-aqueous organic solvent are normal hexane, octane, hexane, and isooctane, while examples of the second non-aqueous organic solvent are hexadecane, octadecane, and xylene.

Preferred washing solvents contain water of not more than 1 ppm, i.e., contain substantially no water, so as to dissolve and remove excessive unreacted chemical adsorption materials. For example, chemical adsorption materials can be removed efficiently by using a non-aqueous organic solvent containing an alkyl group, a fluorocarbon group, a chlorocarbon group or a siloxane group.

The thus obtained chemically adsorbed film can be used for a liquid crystal orientation film for a liquid crystal display.

The washed substrate surface is tilted in a given direction, including a vertical direction, so as to remove the washing solvent remaining on the substrate surface, so that the chemically adsorbed film formed on the substrate surface can be oriented to a tilted direction. That is, the orientation direction for a liquid crystal orientation film can be determined previously through the draining.

The above-mentioned processes can be carried out under an ordinary atmosphere. However, a preferable dry atmosphere has a relative humidity of 45% or less, more preferably, 30% or less. When the humidity of the atmosphere is high, the chemical adsorption material will be reacted with water and the film will become cloudy and whitish soon. It is difficult to wash and remove the cloudy coating film.

A pre-tilt angle of a liquid crystal can be controlled by using plural kinds of silicon-based chemical adsorption materials different in the critical surface energy. For example, the critical surface energy can be controlled easily in a range from 10 mN/m to 55 mN/m by using a chemical adsorption material in which ends or parts of the carbon chain or the siloxane bonding chain are substituted by at least one organic group selected from a carbon trifluoride group (—$CF_3$), a methyl group (—$CH_3$), a vinyl group (—CH=$CH_2$), a vinylene group (—CH=CH—), an ethynylene group (a carbon—carbon triple bond), a phenyl group (—$C_6H_5$), an allyl group (—$C_6H_4$—), a halogen atom, an alkoxy group (—OR; R represents an alkyl group and preferably having 1–3 carbons), a cyano group (—CN), an amino group (—$NH_2$), a hydroxyl group (—OH), a carbonyl group (=CO), a carboxy group (—COO—) and a carboxyl group (—COOH).

The thus obtained liquid crystal orientation film is exposed through a polarizing plate after washing or after a pre-orientation so that the orientation control of the liquid crystal orientation film can be strengthened further. If a particularly-patterned mask is used to provide a plurality of regions having different orientation directions in the liquid crystal orientation film, a multi-domain type liquid crystal orientation film can be obtained.

Examples of light beams used for exposure include an i-ray (wavelength: 365 nm), a g-ray (wavelength: 436 nm), a h-ray (wavelength: 405 nm) or a sterilization ray (wavelength: 254 nm) of an extra-high pressure mercury lamp, and a KrF excimer laser (wavelength: 248 nm). Among them, a sterilization ray of an extra-high pressure mercury lamp and a KrF excimer laser are preferred since they are absorbed easily by most materials.

When the chemical adsorption material is a silane-based chemical adsorption material containing either a straight carbon chain or a siloxane bonding chain together with at least one silyl group selected from a chlorosilyl group, an alkoxy silyl group and an isocyanato silyl group, the silyl groups can be removed without any reaction by using a non-aqueous organic solvent for washing. The washing solvent can contain, for example, an alkyl group, a fluorocarbon group, a chlorocarbon group and a siloxane group.

A high-density chemically adsorbed film can be formed by forming a hydroxyl group-rich coating film on a substrate surface prior to a step of coating a chemical adsorption solution on the substrate surface. For example, a solution of a compound containing plural chlorosilyl groups is coated on a substrate surface in a dry atmosphere. A liquid coating film of the compound is formed by removing the solvent of the solution. In this liquid coating, dehydrochlorination proceeds rapidly between the chlorosilyl groups of the compound and the hydroxyl groups on the substrate surface. When the substrate is washed with a non-aqueous solvent and taken out in the atmosphere after completion of the dehydrochlorination, the chlorosilyl groups remaining on the substrate surface are reacted with moisture in the air, so that a monomolecular coating film comprising inorganic siloxane containing numbers of SiOH bonds, i.e., hydroxyl groups, is formed on the surface.

When a film is formed selectively on the substrate surface, a chemical adsorption solution can be coated on a substrate surface by means of off-set printing, screen printing, slit-coating, roller coating or the like.

A washing solvent having a boiling point in a range from 100° C. to 250° C. facilitates washing of the surface, and thus, a chemically adsorbed film with less flaws is obtained.

Liquid crystal orientation films obtained in the present invention can be used for various liquid crystal displays such as so-called vertical field type liquid crystal displays like twisted nematic type, and so-called horizontal field type liquid crystal display like in-plane switching type.

Preferred examples of the present invention are described below by referring to attached drawings.

EXAMPLE 1

A solvent was prepared by mixing 99 weight parts of hexamethyl silicone having a boiling point of 100° C. and 1 weight part of decamethyltetrasiloxane having a boiling point of 190° C. In the mixed solvent, $CF_3(CF_2)_7(CH_2)_2SiCl_3$ as a silane-based chemical adsorption material was dissolved so as to prepare a chemical adsorption solution having a concentration of 0.5 wt %.

Figure 1:
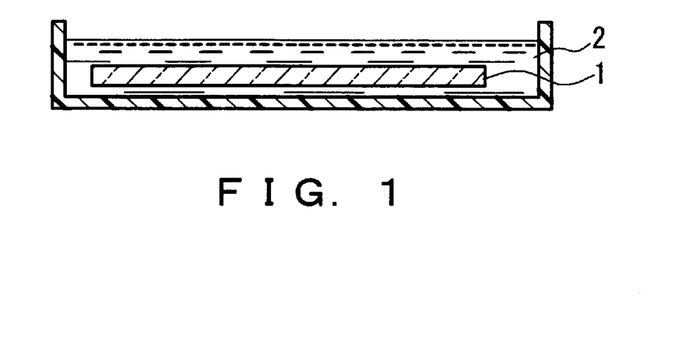
FIG. 1 is a vertical sectional view to show a process of chemical adsorption in one example of the present invention.

A prepared glass substrate had a transparent electrode of indium tin oxide (ITO) on the surface. After being washed for degreasing, the glass substrate 1 was dipped as shown in FIG. 1 for one minute in a chemical adsorption solution 2 prepared in the above-described process in a dry atmosphere having a relative humidity of at most 30% at a temperature of 25° C. Then, the glass substrate 1 was raised from the solution and held in the atmosphere for five minutes. Since the organic solvent (hexamethyl silicone) having a low boiling point is evaporated first from the chemical adsorption solution adhered onto the substrate, the concentration of the chemical adsorption material in the adsorption solution was concentrated to about 30 times after the five minutes, and the time required for this treatment was shortened to 1/20 of the case using a chemical adsorption solution of the same concentration comprising decamethyltetrasiloxane alone for the solvent.

By contacting the glass substrate 1 with the chemical adsorption solution 2, the silane-based chemical adsorption material in the solution can be fixed onto the glass substrate 1 as shown in the Formula 1 due to dehydrochlorination with hydroxyl groups on the surface of the glass sheet 1.

Formula 1

Subsequently, the glass substrate 1 was washed in the dry atmosphere by using dehydrated n-hexane.

Figure 2:
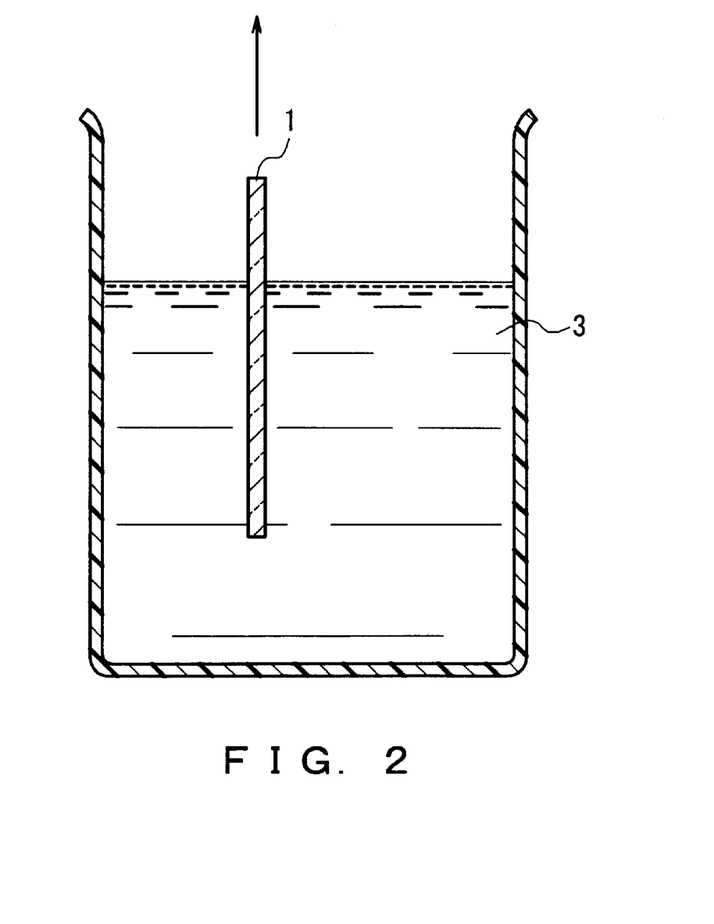
FIG. 2 is a vertical sectional view to show a process of washing a coating film in one example of the present invention.
Figure 3:
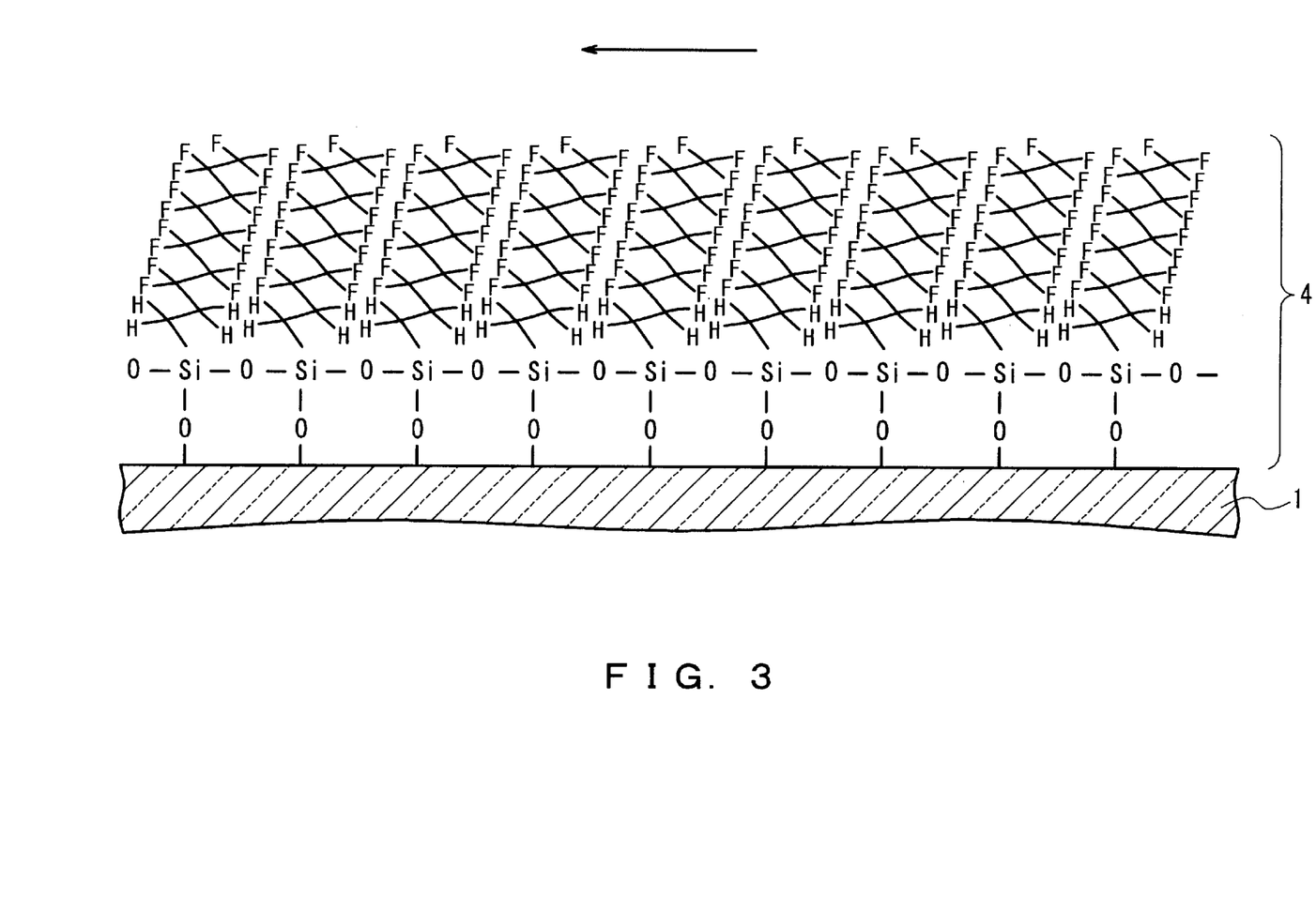
FIG. 3 is a schematic vertical sectional view to show molecules in the chemically adsorbed film.

As shown in FIG. 2, the glass substrate 1 was raised in a direction indicated by an arrow from the n-hexane as a washing solvent 3 in a state standing in a desired direction for draining, and it was exposed to moisture-containing air. As a result of the exposure, a chemical adsorption material 4 fixed onto the glass substrate 1 as shown in FIG. 3 was bonded by siloxane bond to the surface of the glass substrate 1 as a result of a reaction with moisture in the air. The composition can be represented by the following Formula 2.

Formula 2

The thus obtained chemically adsorbed film had a thickness of about 1 nm. The film had a critical surface energy of about 10 mN/m in a measurement by means of a Zisman plot. The contact angle to water was about 120°. No peeling was recognized in an adherence test by a cross-cut taping method (Japanese Industrial Standard or JIS, K5400), and the film demonstrated high peel-resistance. This result shows that the chemically adsorbed film obtained in Example 1 had improved wear-resistance and contamination-resistance.

In an analysis with a Fourier Transform Infrared Spectrometer (FT-IR), carbon chains of the chemical adsorption material 4 fixed onto the substrate 1 were oriented in a direction slightly-tilted with respect to a draining direction shown with an arrow in FIG. 3.

EXAMPLE 2

A solvent was prepared by mixing 99.5 weight parts of hexamethyl silicone having a boiling point of 100° C. and 0.5 weight parts of hexadecane having a boiling point of 287° C.

A chemical adsorption solution of a concentration of 1 wt % was prepared by dissolving in this mixed solvent a mixture containing chemical adsorption materials of $CH_3(CH_2)_{14}SiCl_3$ and $C_6H_5CH=CHCOC_6H_4O(CH_2)_6SiCl_3$ at a mole ratio of 1:1. Here, $CH_3(CH_2)_{14}SiCl_3$ is a straight chain hydrocarbon having a functional group at the end part for controlling the surface energy of the coating film, while $C_6H_5CH=CHCOC_6H_4O(CH)_6SiCl_3$ has a photosensitive group.

A glass substrate comprising a transparent electrode of ITO on its surface was washed for degreasing, and subsequently, dipped in the thus obtained chemical adsorption solution for one minute in a dry atmosphere having a relative humidity of at most 30% at a temperature of 25° C.

The glass substrate was raised from the solution and held for five minutes in the atmosphere. The time required for the treatment is 1/50 of that for a case using a chemical adsorption solution of the same concentration comprising hexadecane alone as a solvent. If all the hexadecane remains and all the hexamethyl silicone is evaporated in the step, the chemical adsorption material in the chemical adsorption solution is concentrated to about 70 times.

It can be concluded from the above-described fact that by contacting the glass substrate with the chemical adsorption solution, the two kinds of chemical adsorption materials in the solution are fixed onto the glass substrate respectively as indicated in the following Formulas 3 and 4 by way of dehydrochlorination with the hydroxyl groups on the glass substrate surface.

Formula 3

Formula 4

The substrate was washed further by using dehydrated n-hexane in a similar dry atmosphere.

The substrate was raised in a desired direction from the n-hexane in a standing state for draining, and exposed in air having a humidity of 50%. Accordingly, the chemical adsorption materials fixed on the glass substrate are reacted with moisture in the air so as to form the compositions described in Formulas 5 and 6.

Formula 5

Formula 6

Figure 4:
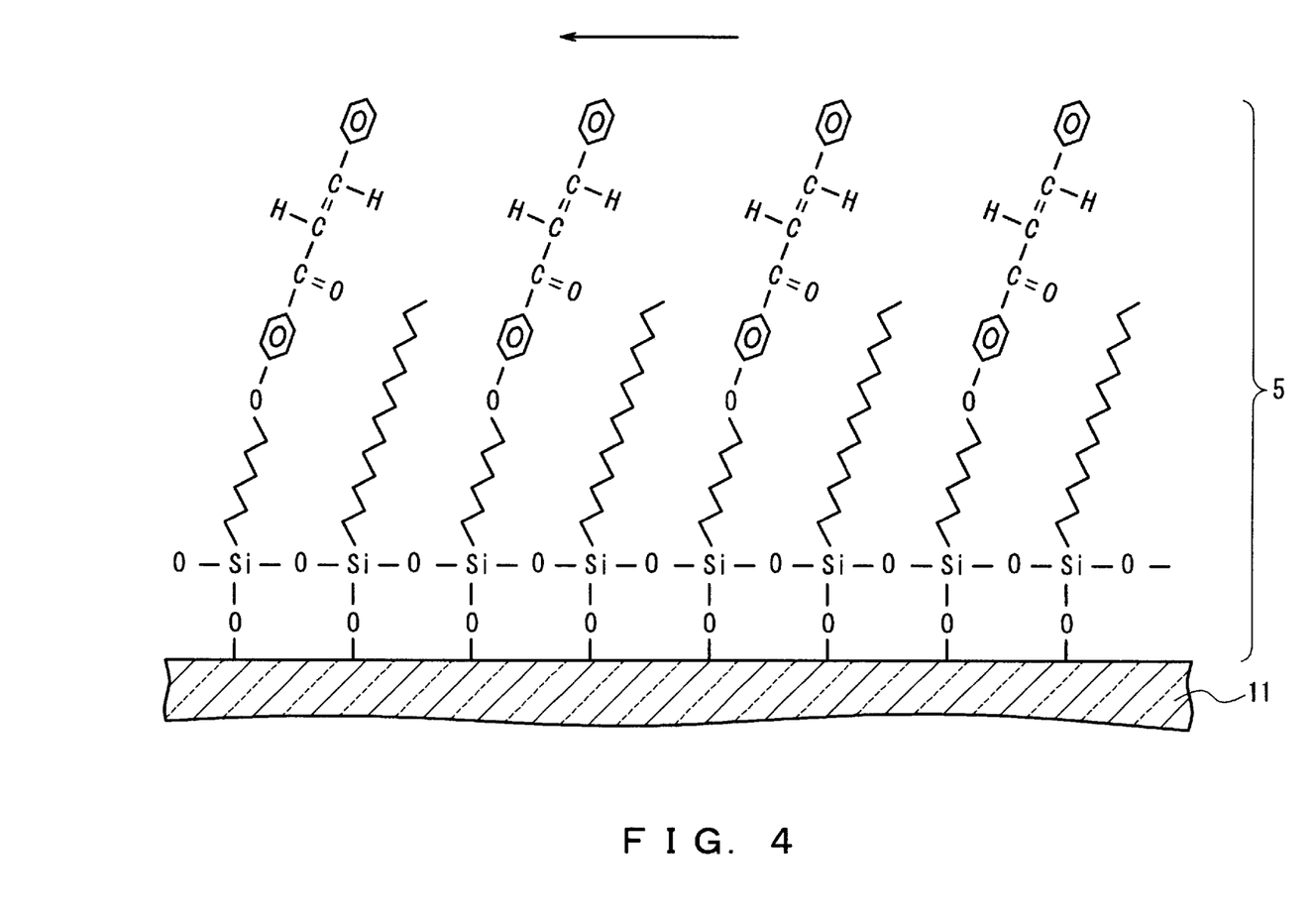
FIG. 4 is a schematic vertical sectional view to show molecules in a coating film after chemical adsorption in an example of the present invention.

Specifically, as shown in FIG. 4, a chemically adsorbed film 5 of a reacted chlorosilane-based chemical adsorption material is bonded via a siloxane covalent bond to a part of the surface of the substrate 11 so as to replace the hydroxyl groups.

The thus obtained film had a thickness of about 1.7 nm. As a result of FT-IR analysis, carbon chains of the chemical adsorption materials fixed onto the substrate were tilt-oriented in the draining direction.

A pair of glass substrates having surfaces on which chemically adsorbed films 5 were formed was set so that the chemically adsorbed films faced to each other with the anti-parallel orientation, and thus, a liquid crystal cell having a cell gap of 20 microns were assembled. A nematic liquid crystal (ZLI 4792 supplied by Merck & Co., Inc.) was injected into the liquid crystal cell in order to check the orientation. The injected liquid crystal molecules were oriented with a pre-tilt angle of about 4° with respect to the substrate, with the axes following along the draining direction at the time of washing. In an analysis with FT-IR, the chemical adsorption materials in the films were oriented with the carbon chains tilted to some degree in the draining direction.

The thus obtained chemically adsorbed films were used for liquid crystal orientation films to produce a liquid crystal display panel.

A pair of glass substrates were prepared by forming a group of electrodes on the surfaces. On the glass substrates, chemically adsorbed film as liquid crystal orientation films were formed respectively with the above-mentioned process.

Figure 5:
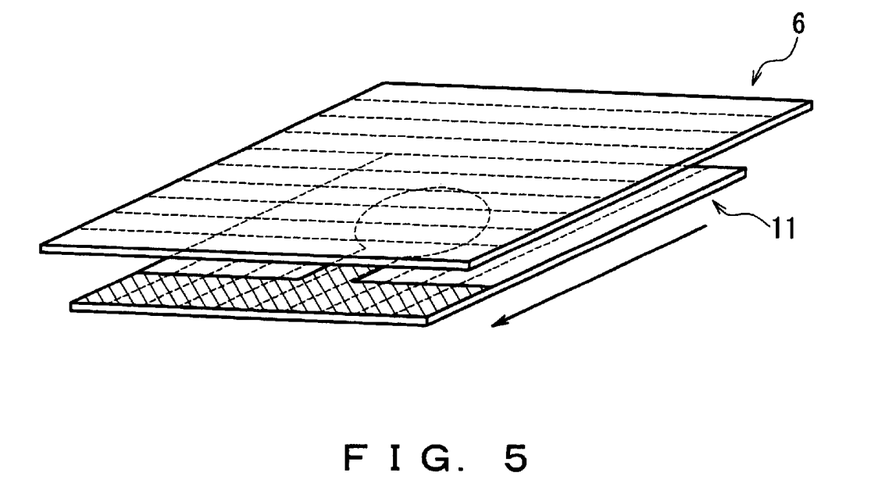
FIG. 5 is a perspective view of an exposure process in one example of the present invention.

As shown in FIG. 5, a polarizing plate 6 (HNPB supplied by Polaroid Corporation) was laid on a chemically adsorbed film on a glass substrate 11 so that the optical axis of the transmitted light indicated with an arrow formed an angle of 87° with respect to the direction of raising the glass substrate for draining. Then, an i-ray having a wavelength of 365 nm that had passed through the polarizing plate 6 from above in FIG. 5 was irradiated on the chemically adsorbed film for a time sufficient to provide 400 mJ by using an extra-high voltage mercury lamp of 500 W At this time, the output after passing through the polarizing plate 6 was 3.6 mW/cm².

In an analysis with FI-IR, one of the two kinds of chemical adsorption materials contained in the chemically adsorbed films did not have any discernible changes while the photosensitive groups ($C_6H_5CH=CHCOC_6H_4$—) of the remaining material were polymerized with each other by the irradiation and changed as shown in the following Formula 7.

Figure 6:
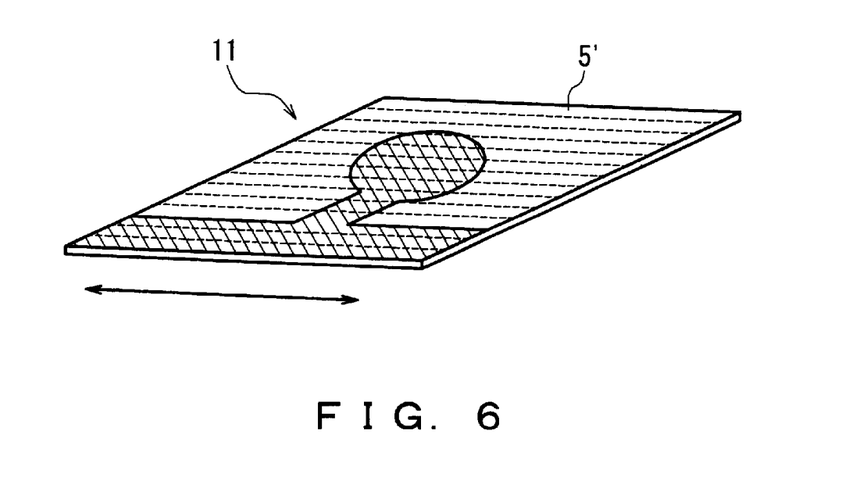
FIG. 6 is a perspective view to show a coating film after the exposure in one example of the present invention.

Accordingly, as shown in FIG. 6, an exposed chemically adsorbed film 5' is oriented in a direction along the direction of the optical axis of the irradiated light.

Formula 7

Figure 7:
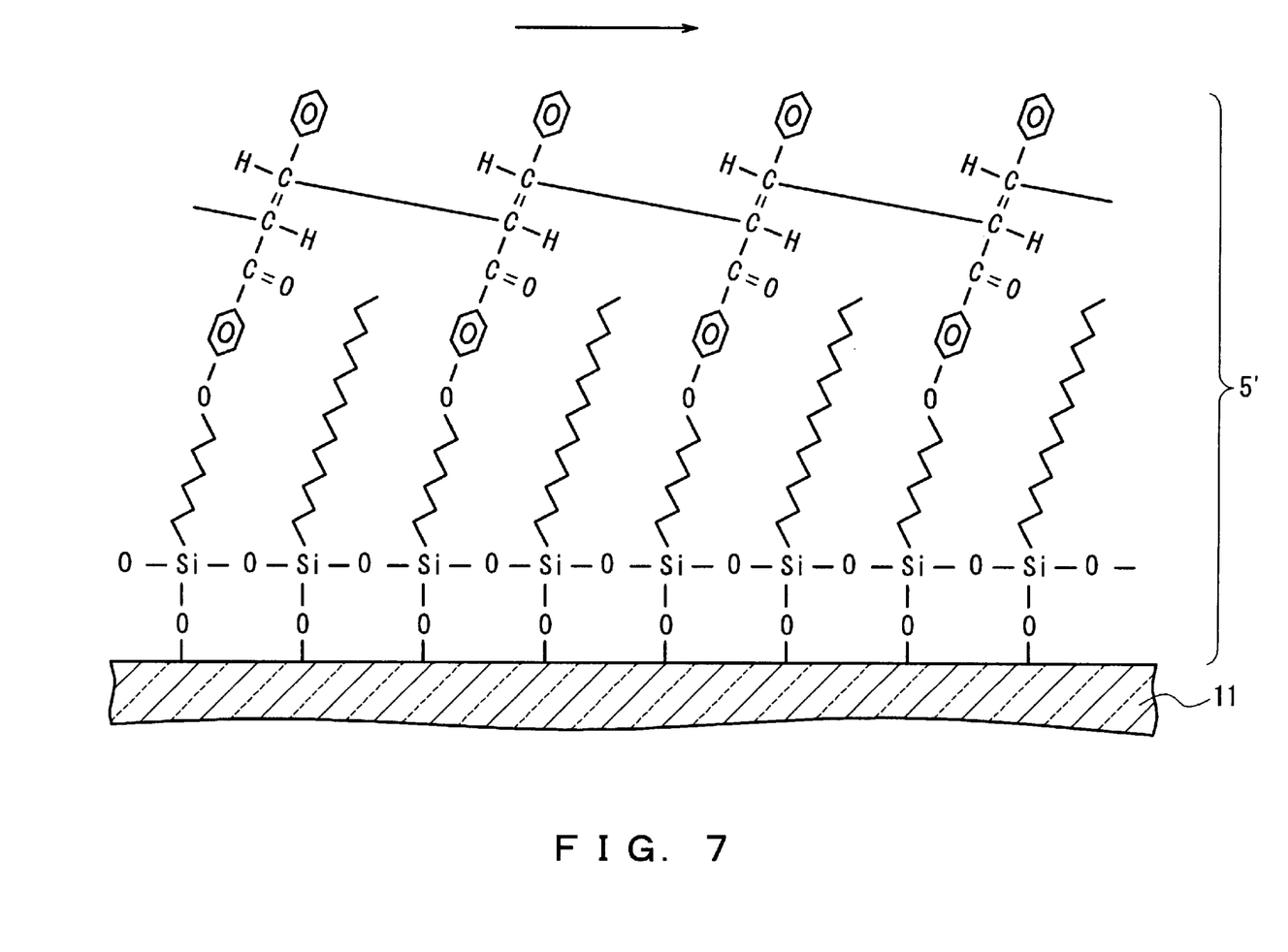
FIG. 7 is a schematic vertical sectional view to show molecules in a coating film after the exposure in one example of the present invention.

FIG. 7 shows a molecular structure of the thus obtained film.

The two substrates 11 were combined with each other so that the chemically adsorbed films 5' faced each other and were oriented to be anti-parallel, and thus, a liquid crystal cell having a cell gap of 20 microns was assembled. A nematic liquid crystal (ZLI 4792 supplied by Merck Co., Ltd.) was injected into the liquid crystal cell so as to check the orientation. The injected liquid crystal molecules were oriented along the polarization direction with a pre-tilt angle of about 4° with respect to the substrate.

In an analysis with FT-IR, there was no change in the critical surface energy of the chemically adsorbed film 5' and the tilt angle, while the orientation direction of the straight carbon chain of the chemical adsorption material changed to be substantially parallel to the optical axis of the irradiated polarization of light, and the variation in the orientation was improved when compared to that just after the draining.

For aligning the orientation direction of the adsorbed molecules in one direction, the transmission axis of the polarizing plate (i.e., optical axis of the transmitted light) cannot intersect the draining direction at a right angle of 90°, but the intersection should be shifted, preferably by several degrees. If the axis intersected at the right angle, individual molecules would face in separate two directions different from each other by 180°. Orientation control performance of the chemically adsorbed film can be improved further by setting the transmission axis of the polarizing plate to be parallel to the draining direction of the washing solution.

When the orientation direction is to be varied selectively on the substrate surface, the substrate was raised from the solution previously for draining and laid with a polarizing plate having a transmission axis in a direction different from that of the draining direction and also a mask having a desired pattern. Then, the substrate was irradiated with an ultraviolet ray having a wavelength of 365 nm with an energy from 200 mJ to 500 mJ. As a result, the orientation direction at the irradiated portions varies. And thus, the oriented film will have a pattern of portions different in the orientation direction. That is, some portions in the oriented film are oriented along with the raise-draining direction and with the polarization direction respectively.

Chemically adsorbed films were formed by varying the blend ratio of $CH_3(CH_2)_{14}SiCl_3$ and $C_6H_5CH=CHCOC_6H_4O(CH_2)_6SiCl_3$. In an evaluation as mentioned above, the critical surface energy of the films was increased from 24 mN/m to 35 mN/m while the pre-tilt angle was decreased from 86° to 3° as the ratio of the $CH_3(CH_2)_{14}SiCl_3$ was lowered. Preferable figures in use were obtained when the ratio was in a range from 50:1 to 1:50. As mentioned above, the critical surface energy of the film and the pre-tilt angle of the liquid crystal can be controlled by adjusting the blend ratio of the chemical adsorption materials.

This performance is not limited to a mixture according to the present invention, which comprises a silane-based chemical adsorption material having a carbon chain represented as —$(CH_2)_{14}$— and a silane-based chemical adsorption material having a photosensitive group and a carbon chain represented as —$(CH_2)_6$—. For example, the orientation direction can be controlled by using the polarization direction, and the pre-tilt angle can be controlled similarly by means of the critical surface energy of a chemically adsorbed film even when the mixture of chemical adsorption materials has a carbon chain represented as —$(CH_2)_n$— (n is an integer from 1 to 25) or a siloxane bonding chain represented as —$(SiO)_n$— (n is an integer from 1 to 15).

The critical surface energy was reduced to 14 mN/m when a fluorine-containing chemical adsorption material such as $CF_3(CF_2)_7(CH_2)SiCl_3$ was used as a substitute for $CH_3(CH_2)_4SiCl_3$. The pre-tilt angle of the liquid crystal was substantially 90° when the content was 20 wt %. The orientation varied quite uniformly when voltage was applied to drive the cell.

When the chemical adsorption material included either an alkoxy silyl group or an isocyanato silyl group, the thus obtained chemically adsorbed film had a similar function as a liquid crystal orientation film though the reaction speed was decreased to some degree.

EXAMPLE 3

Figure 8:
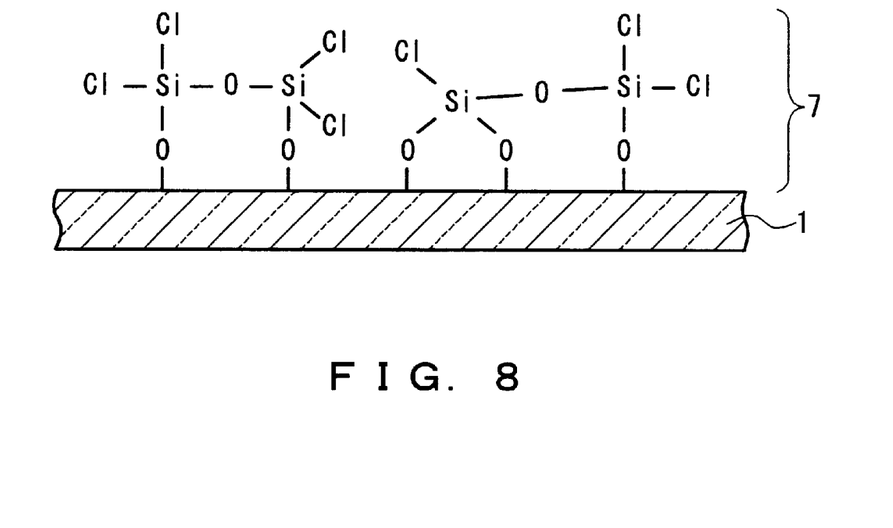
FIG. 8 is a schematic vertical sectional view to show molecules in a coating film during formation of the hydroxyl group-rich coating film in an example of the present invention.
Figure 9:
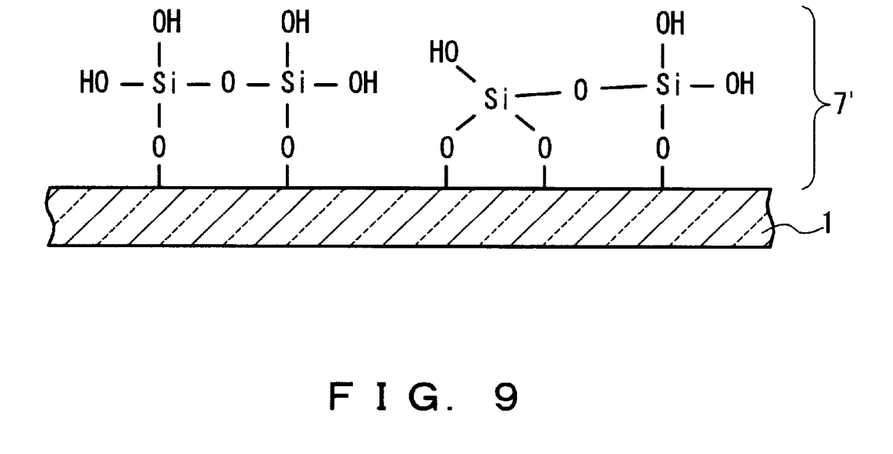
FIG. 9 is a schematic vertical sectional view to show molecules in the hydroxyl group-rich coating film.

In a dry atmosphere having a relative humidity of at most 30%, $Cl_3SiOSiCl_3$ was dissolved in dehydrated toluene so as to prepare a solution of 1 wt % concentration. In the same dry atmosphere, a glass substrate was dipped in the solution for one minute. The glass substrate was raised from the solution and held for 10 minutes in the atmosphere so as to evaporate toluene adhered to the substrate. Subsequently, the substrate was washed well with dehydrated chloroform. Accordingly, dehydrochlorination occurred between the hydroxyl groups on the substrate surface and the $Cl_3SiOSiCl_3$ in order to form a monomolecular film 7 as shown in FIG. 8 on the substrate surface via —SiO— bonds. The substrate was exposed in the air so as to be reacted with moisture in the air, and thus, as shown in FIG. 9, a siloxane monomolecular film 7' comprising a number of hydroxyl groups thereon was formed on the surface of the substrate 1 via the —SiO— bonds.

The siloxane monomolecular film 7' was bonded strongly to the substrate 1 via chemical bonding of the —SiO— bonds. The thus obtained coating film has a number of SiOH bonds on the surface. It should be noted especially that about twice or triple numbers of hydroxyl groups were generated when compared to a case of the surface of the glass substrate 1. The treated portion in this state had extremely high hydrophilicity.

After the treatment, a chemically adsorbed film was formed as in Example 1 by using a chemical adsorption solution.

Accordingly, a chemically adsorbed film as shown in Example 1 was formed in a chemically-bonded state by means of a siloxane covalent bond via a hydroxyl group-rich monomolecular coating film 7'. The film had a thickness of about 1.8 nm. Since the monomolecular film 7' formed on the surface of the substrate 1 for fixing chemical adsorption materials had many hydroxyl groups, the obtained film was more highly concentrated than the film of Example 1. The obtained film had a lipophilic surface.

In this Example, the time for chemical adsorption was shortened considerably to 11 minutes by forming a hydroxyl group-rich coating film and by use of a mixed solvent, while a similar chemical adsorption generally takes 1–2 hours in a conventional film formation process.

The thus obtained pair of substrates were combined with each other so that the chemically adsorbed films faced each other and were oriented to be anti-parallel, and thus, a liquid crystal cell having a cell gap of 20 microns was assembled. A nematic liquid crystal (ZLI 4792 supplied by Merck Co., Ltd.) was injected into the liquid crystal cell so as to check the orientation. The injected liquid crystal molecules were oriented along the polarization direction with a pre-tilt angle of about 5° with respect to the substrate.

When the above-mentioned $Cl_3SiOSiCl_3$ was replaced by another silyl compound comprising plural chloro groups $Cl-(SiCl_2O)_n-SiCl_3$ (n is an integer), a highly concentrated liquid crystal orientation film was formed in a short time as well. When n is in a range from 0 to 3, handling becomes easy at a time of forming a hydroxyl group-rich film.

EXAMPLE 4

Chemically adsorbed films were formed in the process described in Example 2 by varying the blend ratio of the chemical adsorption materials in a range from 1:0 to 0:1. The materials were $ClSi(CH_3)_2OSi(CH_3)_2OSi(CH_3)_2OSi(CH_3)_2Cl$ and $C_6H_5CH=CHCOC_6H_4(CH_2)_6SiCl_3$. In an evaluation of the obtained films, the critical surface energy was decreased from 37 mN/m to 23 mN/m as the concentration of the $ClSi(CH_3)_2OSi(CH_3)_2OSi(CH_3)_2OSi(CH_3)_2Cl$ was lowered. Furthermore, the pre-tilt angle of the liquid crystal varied in a range from 5° to 87° in an evaluation carried out by assembling a liquid crystal cell.

EXAMPLE 5

Chemically adsorbed films were formed in the process described in Example 2 by varying the blend ratio of the chemical adsorption materials in a range from 1:0 to 1:20. The materials were $CH_3CH_2C^*HCH_3CH_2OCO(CH_2)_{10}SiCl_3$ ($C^*$ is an asymmetric carbon) and $C_6H_5CH=CHCOC_6H_4O(CH_2)_6SiCl_3$. In an evaluation of the obtained films, the critical surface energy was increased from 31 mN/m to 41 mN/m as the concentration of the $CH_3CH_2C^*HCH_3CH_2OCO(CH_2)_{10}SiCl_3$ was reduced. Furthermore, the pre-tilt angle of the liquid crystal varied in a range from 3° to 0.1° in an evaluation carried out by assembling a liquid crystal cell.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, all changes that come within the meaning and range of equivalency of the claims are intended to be embraced therein.

What is claimed is:

1. A chemical adsorption solution comprising a silane-based chemical adsorption material dissolved in a non-aqueous organic solvent, wherein
   the non-aqueous organic solvent is a mixture of a first non-aqueous organic solvent and a second non-aqueous organic solvent having a boiling point higher than a boiling point of the first non-aqueous organic solvent wherein the content of the second non-aqueous organic solvent in the mixture is a range of 0.1% to 20% by weight.

2. The chemical adsorption solution according to claim 1, wherein a content of the second non-aqueous organic solvent in the mixture is in a range from 1% to 10% by weight.

3. The chemical adsorption solution according to claim 1, wherein a difference in the boiling point between the first non-aqueous organic solvent and the second non-aqueous organic solvent is in a range from 10° C. to 200° C.

4. The chemical adsorption solution according to claim 3, wherein a difference in the boiling point between the first non-aqueous organic solvent and the second non-aqueous organic solvent is in a range from 20° C. to 100° C.

5. The chemical adsorption solution according to claim 1, wherein the first non-aqueous organic solvent has a boiling point in a range from 65° C. to 120° C.

6. The chemical adsorption solution according to claim 1, wherein the first non-aqueous organic solvent has a boiling point in a range from 100° C. to 120° C.

7. The chemical adsorption solution according to claim 1, wherein the second non-aqueous organic solvent has a boiling point of at least 150° C.

8. The chemical adsorption solution according to claim 1, wherein the chemical adsorption material comprises at least one chain selected from the group consisting of a straight carbon chain and a siloxane bonding chain and also at least one silyl group selected from the group consisting of a chlorosilyl group, an alkoxysilyl group, and an isocyanato silyl group.

9. A method of producing a chemically adsorbed film, comprising:
   preparing a chemical adsorption solution by dissolving a silane-based chemical adsorption material in a mixture of a first non-aqueous organic solvent and a second non-aqueous organic solvent having a boiling point higher than a boiling point of the first non-aqueous organic solvent wherein the content of the second non-aqueous organic solvent in the mixture is in a range of 0.1% to 20% by weight;
   adhering the chemical adsorption solution to a surface of a substrate;

concentrating the chemical adsorption solution adhered to the substrate surface by evaporating the first non-aqueous organic solvent preferentially while keeping the second non-aqueous organic solvent so as to chemically bond the end parts of the chemically adsorbed molecules in the chemical adsorption solution with the substrate surface; and washing the substrate surface with a washing solvent in order to remove the chemical adsorption solution remaining on the substrate.

10. The method according to claim 9, wherein hydrophilic groups are exposed on the surface of the substrate.

11. The method according to claim 9, wherein molecules of the chemical adsorption material fixed to the substrate surface is oriented into a draining direction by tilting the washed substrate surface in a specific direction so as to remove the washing solvent adhered to the substrate surface.

12. The method according to claim 9, wherein a content of the second non-aqueous organic solvent in the mixture is in a range from 1% to 10% by weight.

13. The method according to claim 9, wherein a difference in the boiling point between the first non-aqueous organic solvent and the second non-aqueous organic solvent is in a range from 10° C. to 200° C.

14. The method according to claim 13, wherein a difference in the boiling point between the first non-aqueous organic solvent and the second non-aqueous organic solvent is in a range from 20° C. to 100° C.

15. The method according to claim 9, wherein the first non-aqueous organic solvent has a boiling point in a range from 65° C. to 120° C.

16. The method according to claim 9, wherein the the first non-aqueous organic solvent has a boiling point in a range from 100° C. to 120° C.

17. The method according to claim 9, wherein the second non-aqueous organic solvent has a boiling point of at least 150° C.

18. The method according to claim 9, wherein the first non-aqueous organic solvent is a methyl silicone-based solvent.

19. The method according to claim 9, wherein the first non-aqueous organic solvent is a hydrocarbon-based solvent.

20. The method according to claim 9, wherein the second non-aqueous organic solvent is selected from a methyl silicone-based solvent and a hydrocarbon-based solvent.

21. The method according to claim 9, wherein the washing solvent contains substantially no water.

22. The method according to claim 9, wherein the washing solvent comprises at least one kind of organic group selected from the group consisting of an alkyl group, a fluorocarbon group, a chlorocarbon group, and a siloxane group.

23. The method according to claim 9, wherein the chemical adsorption material comprises at least one chain selected from the group consisting of a straight carbon chain and a siloxane bonding chain and also at least one silyl group selected from the group consisting of a chlorosilyl group, an alkoxysilyl group, and an isocyanato silyl group.

* * * * *